US012259106B1

(12) United States Patent
Connery

(10) Patent No.: US 12,259,106 B1
(45) Date of Patent: Mar. 25, 2025

(54) ADJUSTABLE TELESCOPING OUTDOOR LIGHT SUSPENSION SYSTEM

(71) Applicant: Jason Hunter Connery, Mesa, AZ (US)

(72) Inventor: Jason Hunter Connery, Mesa, AZ (US)

( * ) Notice: Subject to any disclaimer, the term of this patent is extended or adjusted under 35 U.S.C. 154(b) by 0 days.

(21) Appl. No.: 18/930,593

(22) Filed: Oct. 29, 2024

(51) Int. Cl.
*F21S 8/08* (2006.01)
*F21S 8/00* (2006.01)
*F21S 8/06* (2006.01)
*F21V 21/116* (2006.01)
*F21V 21/22* (2006.01)

(52) U.S. Cl.
CPC ............... *F21S 8/086* (2013.01); *F21S 8/032* (2013.01); *F21S 8/068* (2013.01); *F21V 21/116* (2013.01); *F21V 21/22* (2013.01)

(58) Field of Classification Search
CPC . F21S 8/032; F21S 8/086; F21S 8/068; F21V 21/116; F21V 21/22
USPC .......................................................... 362/413
See application file for complete search history.

(56) References Cited

U.S. PATENT DOCUMENTS

| | | | | |
|---|---|---|---|---|
| 4,319,311 A * | 3/1982 | Mitchell | F16B 7/0493 | 362/426 |
| 5,964,524 A * | 10/1999 | Qian | F21V 21/06 | 362/431 |
| 10,386,048 B2 * | 8/2019 | Enck, Sr. | E04H 12/22 | |
| 2015/0077967 A1 * | 3/2015 | Pellenc | F21L 4/00 | 362/108 |
| 2022/0228702 A1 * | 7/2022 | Dai | F04D 29/601 | |
| 2023/0199925 A1 * | 6/2023 | Harcourt | F21S 6/004 | 362/249.02 |

* cited by examiner

*Primary Examiner* — Laura K Tso
(74) *Attorney, Agent, or Firm* — John Baker

(57) ABSTRACT

An Adjustable Camping/Utility Light Suspension Device is a versatile, telescoping system designed to suspend various existing lighting sources, including LED, propane, and gas lanterns, for outdoor activities. Capable of vertical adjustment up to 10 feet and horizontal extension up to 10 feet, it provides optimal illumination over large areas, enhancing safety and convenience, the device includes a 30-foot rope for light suspension, an iron spiked base for unlevel terrain, and a weightable plastic base for stable use on concrete. Once the base is set, the telescoping boom system and light source are easily adjusted, offering a secure and flexible lighting solution in dark outdoor environments.

7 Claims, 7 Drawing Sheets

FIG. 7
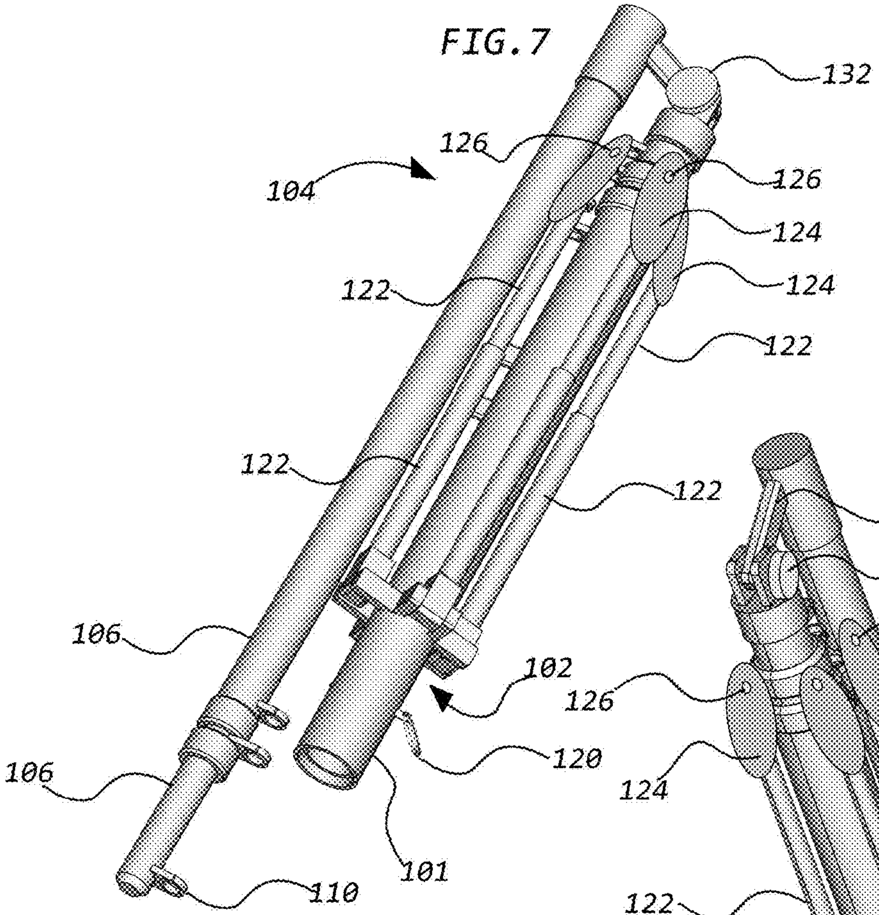
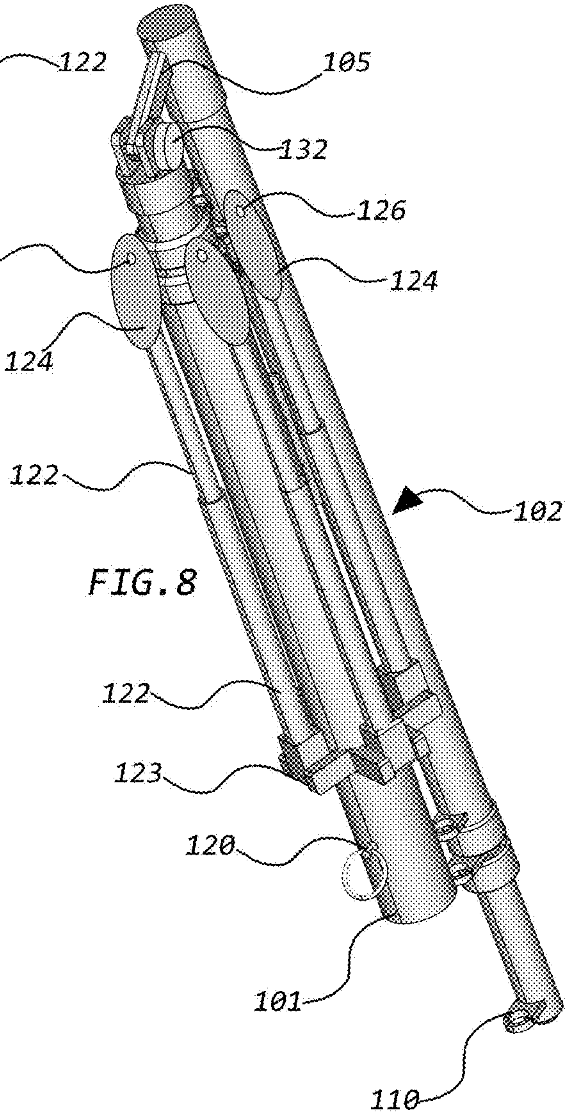
FIG. 8

ADJUSTABLE TELESCOPING OUTDOOR LIGHT SUSPENSION SYSTEM

FIELD OF THE INVENTION

The present invention relates to outdoor lighting systems.

BACKGROUND OF THE INVENTION

Outdoor lighting systems used in camping and utility activities often face limitations in adaptability, particularly in uneven terrain and in providing optimal lighting coverage. Traditional lanterns or lighting sources are usually suspended from trees, poles, or portable tripods, which may not offer the necessary height, stability, or flexibility in positioning. These systems can struggle with uneven ground or hard surfaces such as concrete, and often require multiple lights to adequately illuminate larger areas, resulting in increased setup time and resource consumption. Additionally, existing solutions lack versatility in height adjustment and horizontal reach, limiting the ability to cast light over a wide area. The need for a secure, adjustable, and adaptable outdoor lighting system that can accommodate various environments and provide optimal illumination remains unmet.

What is needed is an adjustable telescoping device, that addresses the foregoing shortcomings by offering height and horizontal adjustments, making it highly adaptable to both unlevel earth and hard surfaces, ensuring safety and convenience.

It would be desirable to provide an adjustable telescoping suspension device for securely positioning and supporting various light sources, such as LED, propane, and gas lanterns.

It would be especially desirable if the foregoing device were particularly adaptable to uneven terrain as well as flat surfaces and allow for optimal light placement and providing stable, elevated illumination over large areas, making it suitable for a wide range of outdoor activities.

BENEFITS OF THE INVENTION (i.) Versatile Compatibility: Supports a wide range of lighting systems, including LED, propane, and gas lanterns, making it adaptable for various camping and utility needs.

(ii.) Adjustable Height and Reach: The telescoping system allows the light source to be raised up to 10 feet and rotated 180 degrees, and extended horizontally up to 10 feet, providing customizable light coverage for large areas.

(iii.) Stable on Uneven Surfaces: Designed for use on both unlevel earth and flat surfaces, thanks to the inclusion of an iron spiked base for earth and a water-fillable base for concrete.

(iv.) Enhanced Safety: By elevating the light source, the device reduces the risk of accidental knocks or spills, adding safety to nighttime outdoor activities.

(v.) Convenient Setup: Quick assembly with minimal tools, allowing users to efficiently suspend lighting systems in a variety of outdoor settings.

(vi.) Efficient Illumination: A single device can provide extensive lighting over large areas, eliminating the need for multiple light sources and enhancing visibility in dark outdoor spaces.

(vii.) Portable and Lightweight: Constructed from high-strength aluminum, steel, plastic, and iron, the device is durable yet easy to transport and set up in remote locations.

(viii.) Increased Flexibility: The rotating telescoping vertical extension, and the 30-foot rope allow for precise positioning and suspension of the light source, providing more control over where light is directed.

(ix.) Durability: Made from high-strength materials like aluminum and iron, the device is designed to withstand harsh outdoor conditions, ensuring long-lasting use.

SUMMARY OF THE INVENTION

An Adjustable Camping/Utility Light Suspension Device, also known as IllumaCamp™, is designed to provide a versatile and stable solution for suspending a wide range of outdoor lighting systems, such as LED lights, propane lanterns, and gas lanterns. The device features a vertical portion that can telescope vertically up to 10 feet and a boom portion that can telescope horizontally up to 10 feet. The vertical telescoping portion can be rotated 180 degrees in either direction, allowing for optimal positioning of the light source to illuminate large areas. It is suitable for use on both uneven terrain, utilizing an iron spiked base, and flat surfaces, with a weightable plastic base for stability. Constructable from high-strength aluminum, steel, fiberglass, resins, carbon fiber and weather-resistant plastic; the device is built to withstand harsh outdoor conditions. A length of rope/cable of a suitable weather resistant material ensures flexibility in positioning the light source. The light suspension device enhances safety and convenience during camping or outdoor activities by providing a customizable, durable, and portable lighting suspension system that easily adapts to different environments.

BRIEF DESCRIPTION OF THE DRAWING FIGURES

FIGS. 7 and 8 are perspective views showing the device in a collapsed/folded state;

Figure 1:
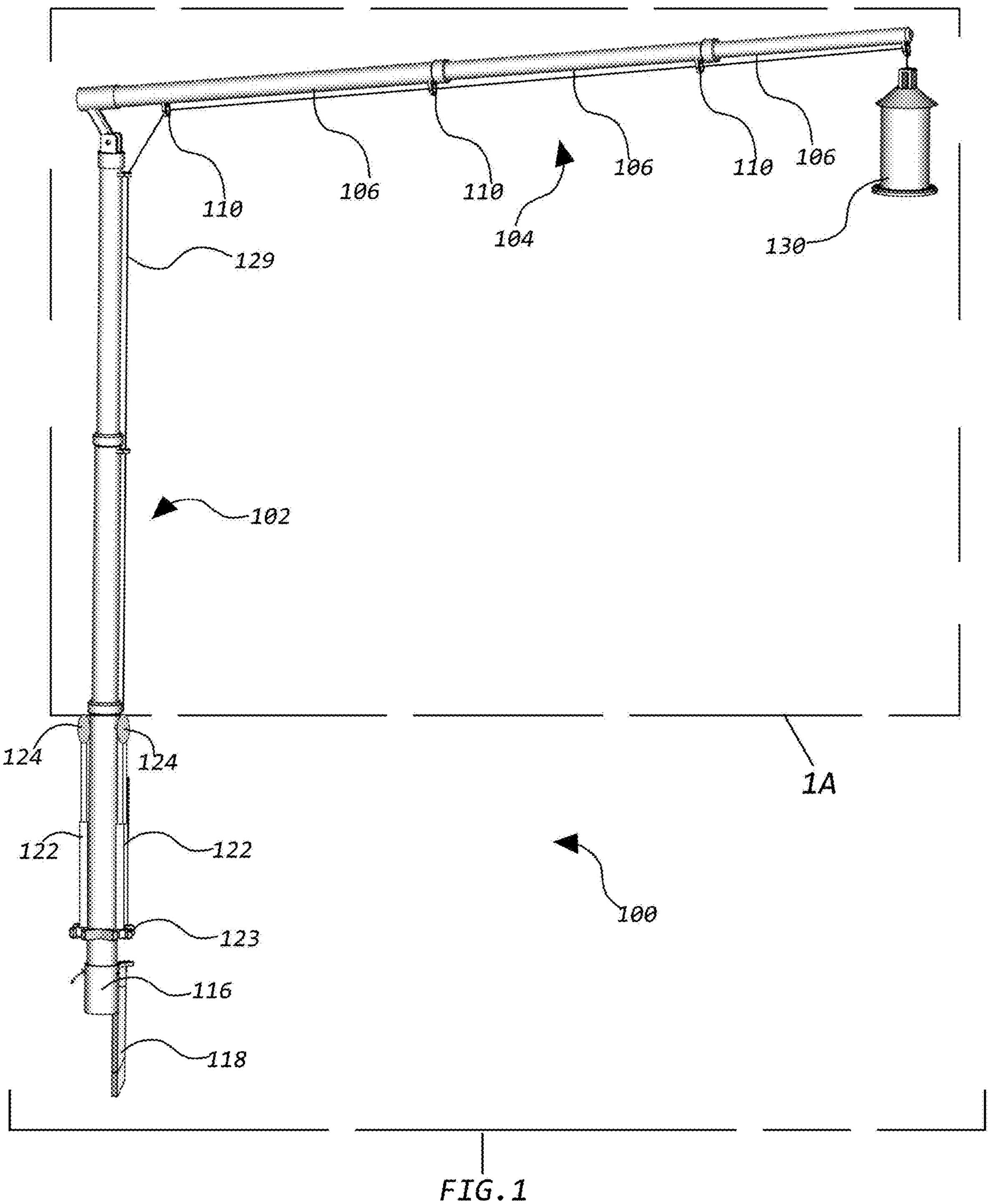
FIG. 1 is a perspective view of a light suspension device according to the present invention.
Figure 2:
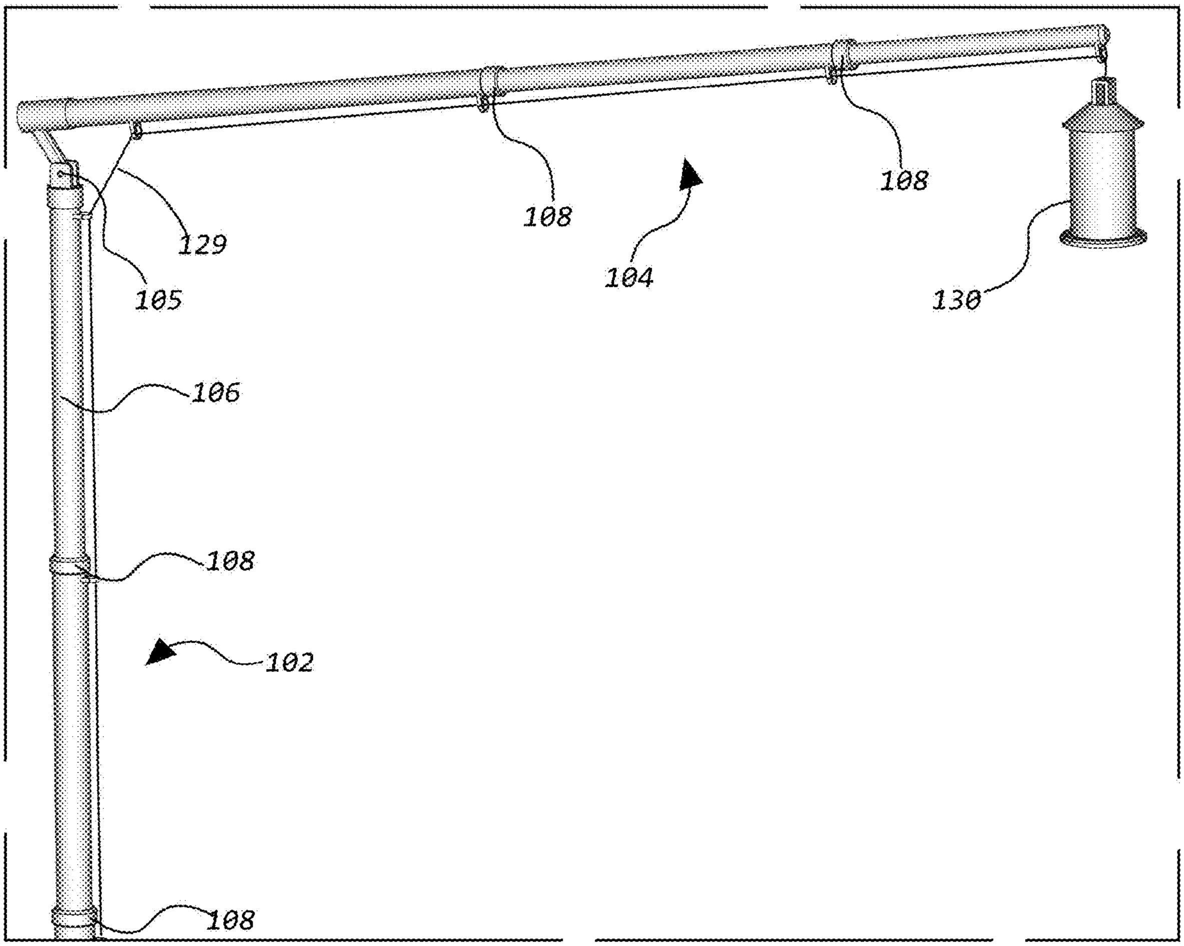
FIG. 2 is a detail view of call-out (1A) of (FIG. 1) showing the upper portion of the device.

REFERENCE TO THE NUMBERED ELEMENTS (100) light support assembly
(101) insertable portion
(102) vertical support
(104) boom portion
(105) boom pivot member
(106) telescoping member
(108) tightening ring
(110) rope guide
(112) weightable base
(114) base receptacle
(116) spiked base
(117) spiked base receptacle (118) spike
(120) securing post and ring
(122) legs
(123) leg pivot
(124) foot pad
(125) leg locking lever
(126) spike aperture
(127) wire spike
(128) rope cleat
(129) rope/cable
(130) light
(132) boom tightening knob
(134) rope safety catch

DETAILED DESCRIPTION OF DRAWINGS

In a preferred embodiment, an adjustable light support assembly (100) includes a telescoping tubular boom system that can extend vertically up to 10 feet and horizontally up to 10 feet. Stabilizing elements include three options: an iron spiked base (116) designed for uneven earth, providing secure anchorage in outdoor terrains, a plastic base that may be filled with water or other available material for use on flat, stable surfaces like concrete and extendable and telescoping legs (122). Each of the telescoping legs includes a foot pad (124) that may rest unanchored or anchored via a wire stake (127) to the ground. The light suspension system includes a rope/cable (129) to allow for versatile adjustment and precise positioning of various lighting sources, such as LED, propane, or gas lanterns. The materials used, including high-strength aluminum, steel, plastic, resins, carbon fiber or other suitable weather resistant materials as would appreciated by those having skill in the art, ensure durability and lightweight portability, making the system ideal for camping or utility use. Once assembled, the light source can be adjusted to illuminate a large area, improving safety and convenience in low-light outdoor conditions. This design offers easy setup, stability on diverse surfaces, and effective illumination for various outdoor activities.

Referring generally to FIGS. 1-9, an adjustable light support assembly (100) according to the present invention includes a vertical support (102) comprising a plurality of telescoping members (106) and tightening rings (108) than are rotated to immobilize adjacent telescoping members and prevent collapse; and, a boom portion (104) extending from the vertical portion (102) wherein the boom portion (102) also comprises a plurality of telescoping members (106). Both the vertical support and boom portions include a number of cable/rope guides (110). A boom pivot member (105) resides atop the vertical structure to enable angular movement of the boom. The light support assembly (100) also includes at least three types of stabilizing structures depending on the environment. At least three pivotable (123) and telescoping legs (122) are arranged circumjacent a lower portion of the vertical support (102) wherein the legs may be deployed collectively or individually depending on ground conditions. Each leg includes a foot pad (124) with an aperture (126) whereby the pad can be anchored to the ground with an wire spike (127); e.g., wire tent stake. Each leg may be pivot into a down or up position and be secured in place by an insertable pin or locking lever (125) (see FIG. 3) that may be rotated. Other methods of securing the position of a leg such as a ratcheting mechanism, a tensioning knob or teeth or catches/detents as would be appreciated by those having skill in the art may be employed in various implementations of the invention. Another stabilizing element includes a spiked base (116) adapted to receive and connect to a bottom end of the vertical support. Spike (118) can be a metal spike with a top flange for hammering into the ground. Yet another stabilizing element includes a weightable base (112) that may be filled with water, sand or other available material and used whenever the light support assembly is on a hard level surface. Both the spiked base (116) and the weightable base (112) includes a receiving portion/cup portion to receive the insertable portion (101) of the vertical support (102) and a securing post/pin and ring (120) is used to join the insertable portion to either a receptacle (117) of the spiked base (116) or the receptacle (114) of weightable base (112). For additional stability, legs (122) can be extended collectively or individually with either the spiked base (116) or the weightable base (112). Light (130) tethering rope or cable (129) is kept from slipping by a spring tensioned clamp or catch (134) (refer to FIG. 9), a pivoting cam type stop, and/or a rope cleat (128).

Figure 3:
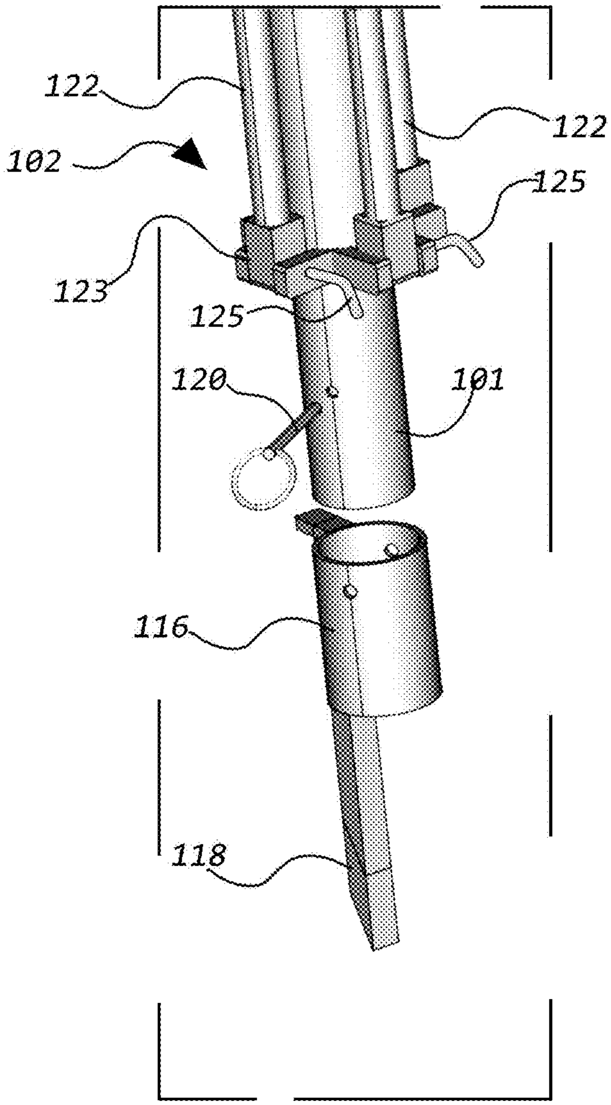
FIG. 3 is a partial enlarged view of a lower portion of the device.
Figure 4:
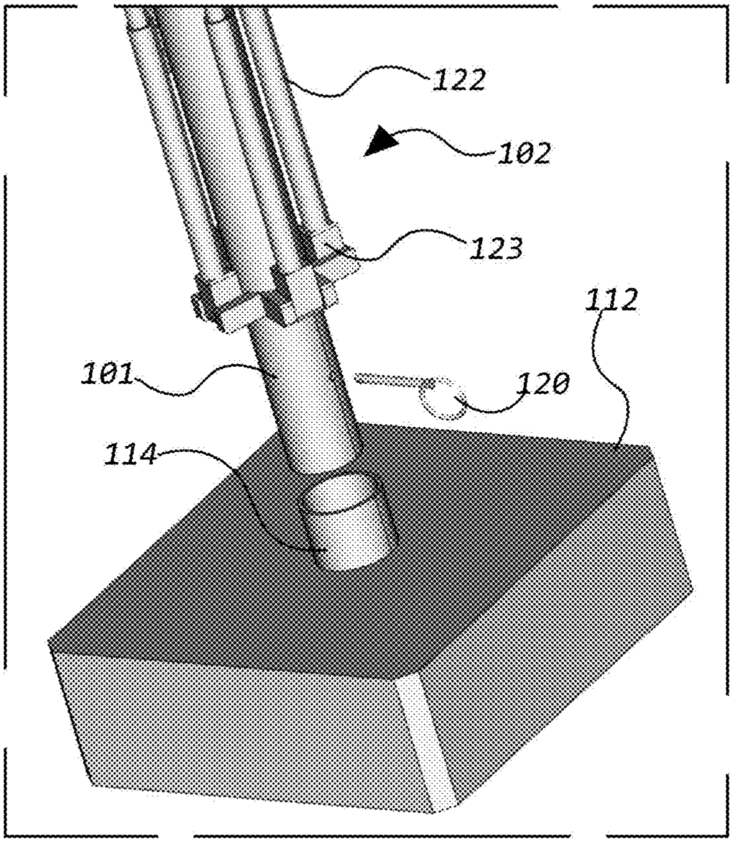
FIG. 4 is a partial exploded view of a lower portion of the device ready for pairing with a weightable base.
Figure 5:
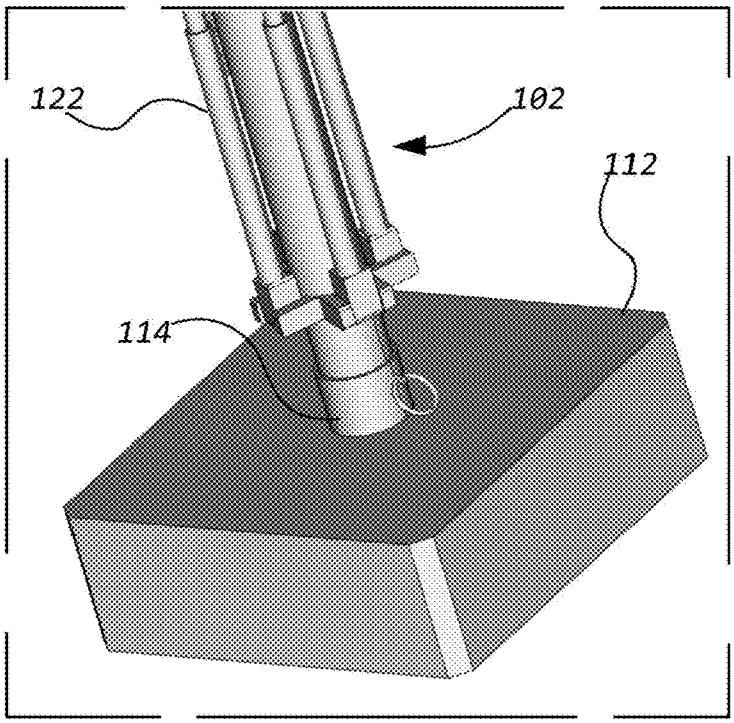
FIG. 5 shows the lower portion thereof inserted into the weightable base.

Moving to FIGS. 3-5, partial exploded views show a lower portion of the vertical support (102) with an insertable portion (101) which is adapted for insertion into either the spiked base (116) or the weightable base (112). The particular position of the legs relative to the weightable base shown in the illustrations is merely exemplary. In some implementations the legs may rest generally atop or over the long sides of the weightable base or in other implementations, the corners thereof.

Figure 6:
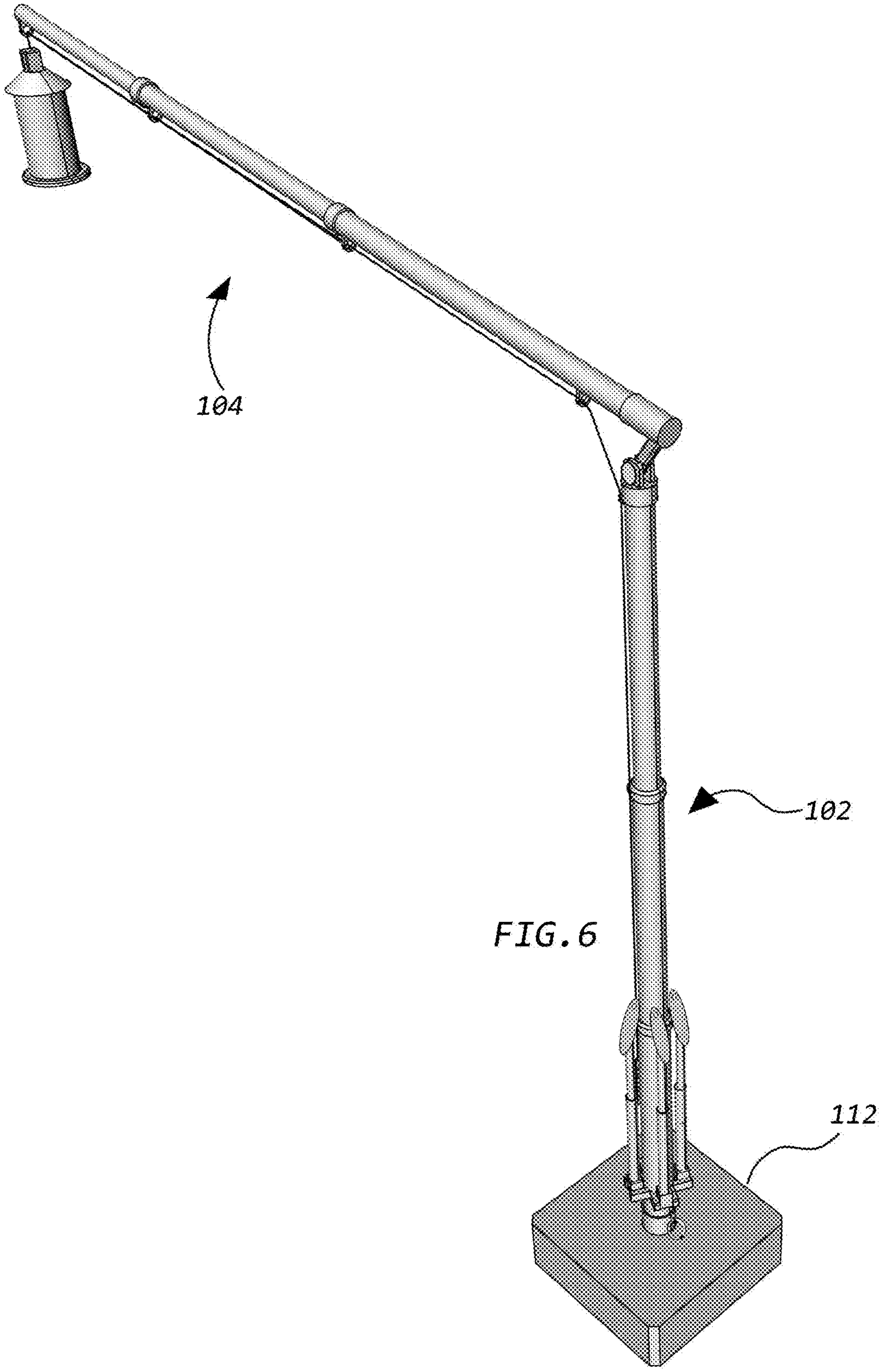
FIG. 6 is a perspective view of the light suspension device paired with the weightable base

FIG. 6 is a perspective view of the fully extended structure complete with tethered (129) light (130) and weightable base (112). A position securing element such as boom tightening knob (132) adjusts the angular position of the boom (104) and secures the light at a desired height. The angular position of the boom may be by any mechanism that would be appreciated by those having skill in the art that is capable of fixing the relative positions of the two telescoping structures, the vertical support and the boom, at the junction of same. Hence a compression knob, toothed mating portions, serrated locking plates such as those manufactured by JW Winco etc., 2815 South Calhoun Rd., New Berlin, WI, may be used in the invention.

Moving to FIGS. 7 and 8, the vertical support (102) and boom portion (104) are shown in an exemplary folded configuration. Shown also are telescoping legs (122) including foot pads (124) with spike/stake apertures (126) adapted for ground anchoring.

Figure 9:
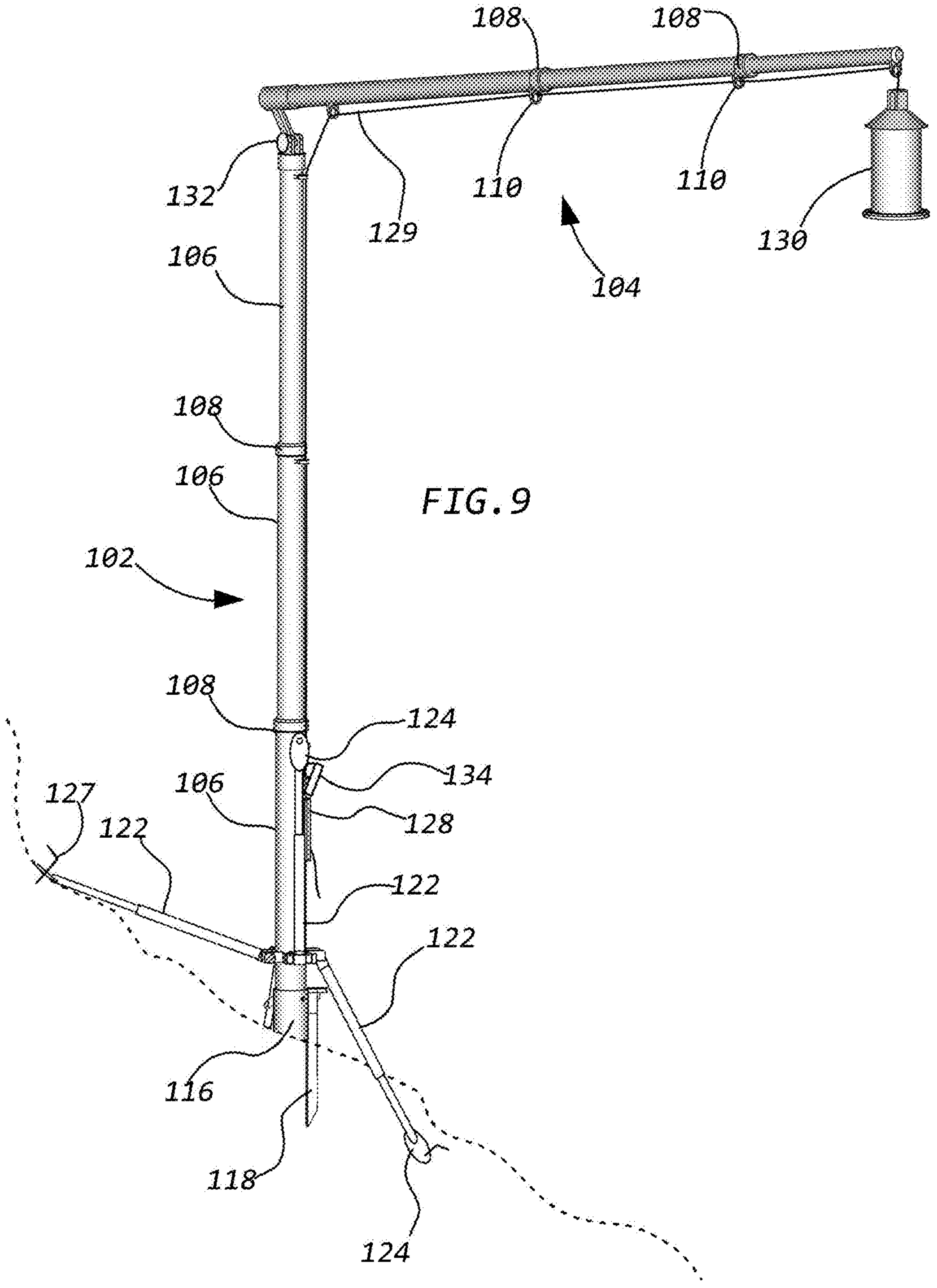
FIG. 9 show the device on uneven terrain where the spiked base is used to anchor the vertical portion and some of the legs are extended to provide additional stability.

FIG. 9 shows the light support assembly (100 placed on uneven ground using the spiked base (116), legs (122) and wire stakes placed through foot pads (124) to stabilize the assembly.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:

1. A portable lighting suspension device for use in outdoor environments, comprising:

a first telescoping support structure extendable vertically from a stabilizing element, the stabilizing element includes at least three extendable legs arranged around a lower portion of the first telescoping structure wherein the legs are extendable in conjunction with either a spiked base or weightable base and wherein the telescoping support structure is adjustable in height;

a second telescoping support structure extendable approximately horizontally from a portion of the first telescoping structure, the second telescoping support structure is pivotable and an end thereof adapted to support a light;

a position securement member at an intersection of the first and second telescoping structures.

2. The device according to claim 1, wherein the stabilizing element comprises:

a spiked iron base receptacle for securing the device on uneven earth.

3. The device according to claim 1, wherein the stabilizing element further comprises:

a plastic base adapted for filling with water or particulate matter for stabilizing the device on flat terrain.

4. The device according to claim 1 wherein the legs include ground-anchorable foot pads and a position locking member.

5. A portable lighting suspension device for use in outdoor environments, comprising:

a first telescoping support structure extendable vertically from a stabilizing element, the stabilizing element includes at least three extendable legs arranged around a lower portion of the first telescoping structure wherein the legs are extendable in conjunction with either a spiked base or weightable base and wherein the telescoping support structure is adjustable in height;

a second telescoping support structure extendable approximately horizontally from a portion of the first telescoping structure, the second telescoping support structure is pivotable and an end thereof adapted to support a light;

a position securement member at an intersection of the first and second telescoping structures, and the portable lighting suspension device further comprising a cable or rope adapted to suspend a lighting element.

6. A portable lighting suspension device for use in outdoor environments, comprising:

a first telescoping support structure extendable vertically from a stabilizing element, the stabilizing element includes at least three extendable legs arranged around a lower portion of the first telescoping structure wherein the legs are extendable in conjunction with either a spiked base or weightable base and wherein the telescoping support structure is adjustable in height;

a second telescoping support structure extendable approximately horizontally from a portion of the first telescoping structure, the second telescoping support structure is pivotable and an end thereof adapted to support a light;

a position securement member at an intersection of the first and second telescoping structures, and the portable lighting suspension device and the first and second telescoping structures include cable or rope guides.

7. A portable lighting suspension device for use in outdoor environments, comprising:

a first telescoping support structure extendable vertically from a stabilizing element, the stabilizing element includes at least three extendable legs arranged around a lower portion of the first telescoping structure wherein the legs are extendable in conjunction with either a spiked base or weightable base and wherein the telescoping support structure is adjustable in height;

a second telescoping support structure extendable approximately horizontally from a portion of the first telescoping structure, the second telescoping support structure is pivotable and an end thereof adapted to support a light;

a position securement member at an intersection of the first and second telescoping structures, and the portable lighting suspension device and the first or second telescoping structures include at least one cable or rope safety catch.

* * * * *